United States Patent [19]
Conklin et al.

[11] 4,161,721
[45] Jul. 17, 1979

[54] ALARM DEVICE HAVING CODE VERIFICATION SYSTEM

[75] Inventors: Robert M. Conklin, Chappaqua, N.Y.; Arthur T. Human, Norwalk, Conn.

[73] Assignee: Holmes Protection, Inc., New York, N.Y.

[21] Appl. No.: 827,528

[22] Filed: Aug. 25, 1977

Related U.S. Application Data

[63] Continuation-in-part of Ser. No. 667,786, Mar. 17, 1976, Pat. No. 4,048,621.

[51] Int. Cl.$^2$ ............................ H04Q 9/00; G08B 21/00
[52] U.S. Cl. .............................. 340/168 B; 340/149 R; 340/147 MD; 340/543
[58] Field of Search .................... 340/164 R, 274, 276, 340/168 R, 168 B, 149 R, 149 A, 365 R; 343/6.5 SS; 178/79

[56] References Cited

U.S. PATENT DOCUMENTS

| | | | |
|---|---|---|---|
| 3,314,051 | 4/1967 | Willcox et al. | 340/152 R |
| 3,833,765 | 9/1974 | Hilborn et al. | 340/365 R |
| 3,839,717 | 10/1974 | Paul | 343/6.5 SS |
| 3,866,173 | 2/1975 | Moorman et al. | 340/149 A |
| 3,968,330 | 7/1976 | Ludwig | 178/79 |
| 4,021,796 | 5/1977 | Fawcett, Jr. et al. | 340/164 R |

*Primary Examiner*—Donald J. Yusko
*Attorney, Agent, or Firm*—Wolder, Gross & Yavner

[57] ABSTRACT

An alarm device having a code verification system is disclosed for registering and transmitting a preselected code to a receiving station. If the preselected code is at the receiving station, no alarm signal will be produced. The code verification system comprises register means under control of an operator for registering a code that is entered therein by the operator. A transmitter is provided which is responsive to a transmit signal for transmitting the contents of the register to the receiving station. A transmitter signal generating means is similarly provided for generating the transmit signal to initiate a transmission. The system further includes a comparator for comparing the code registered in the register with the preselected code and for generating an inhibit signal when the codes are different. Inhibit means is provided which is responsive to the inhibit signal for preventing transmission of the contents of the register.

9 Claims, 4 Drawing Figures

ALARM DEVICE HAVING CODE VERIFICATION SYSTEM

CROSS REFERENCE TO RELATED APPLICATIONS

This application is a continuation-in-part of application Ser. No. 667,786, filed Mar. 17, 1976, and now U.S. Pat. No. 4,048,621, entitled CODING SYSTEM FOR AN ALARM SYSTEM AND THE LIKE, and assigned to the assignees of the present invention.

BACKGROUND OF THE INVENTION

The present invention relates generally to an alarm device incorporating a code verification system and, more particularly, includes a code verification system which is adapted to verify a code at the point of entry of the code and to transmit an alarm signal to a receiving station if an incorrect code is entered into the system.

At present, many burglar alarm systems include a central office that is connected to remote subscribers by telephone lines and the like. In operation, when a subscriber enters a protected premises, the subscribers must transmit a preselected code to the central office to prevent an alarm condition. That is, if the preselected code is not received within a predetermined time interval after entry onto the protected premises, an alarm will be produced at the receiving station.

The code usually comprises a plurality of decimal digits which are transmitted in the form of pulses equal in number to the particular code. That is, if the code to be transmitted is, for example, "32", three pulses will be transmitted followed by a transmission of two pulses. The subscriber produces the pulse code by depressing a button first three times and then two times.

The code may be detected at the receiving station either manually or automatically by use of a computer and the like. However, both of these methods have serious disadvantages associated with their use. To be more specific, in manually or non-computer operated central offices or receiving stations, code verification in usually made by a person who counts the number of times a meter needle moves between two levels. Depending upon the length of the identification code and the speed with which it is produced, a large amount of human error is possible. Accordingly, if the code "seems correct" the observer at the receiving station may very well accept the code as a correct code although the code may, in fact, be incorrect and may have been transmitted by unauthorized personnel. Similarly, the observer may produce an alarm signal even though a correct code has been transmitted.

In a computer-operated central office, the entire code is usually received before the data is processed. Accordingly, a finite delay will be encountered before a particular code can be verified and an incorrect code called to the attention of an observer to signal an alarm condition. In many cases, such delay may permit unauthorized personnel to evacuate the premises before any action can be taken. Accordingly, an object of the present invention is to provide an improved alarm device or system having an entered code verification system.

A more specific object of this aspect of the invention is to provide a code verification system at the point of entry of the code, thereby eliminating the time consuming need to search a memory bank to verify the correctness of the code.

Another object of this invention is to provide an alarm device having a code verification system that acts immediately to transmit an alarm condition to the central office or receiver upon entry of an incorrect code.

A further object of the invention resides in the novel details of circuitry that provides an alarm device having a code verification system of the type described that may be utilized in conjunction with existing code generating systems.

A further object of the invention is the provision of a code verification system in an alarm device that is adapted to transmit a signal to the central office upon entry of an incorrect code which signifies that a hold-up is in progress.

SUMMARY OF THE INVENTION

Accordingly, an alarm device having a code verification system constructed in accordance with the present invention is adapted to register and transmit a preselected code to a receiving station. The system comprises register means under control of an operator for registering a code that is entered therein. Transmitting means is provided which is responsive to a transmit signal for transmitting the contents of the register means to the receiving station. Transmit signal generating means operates to generate the transmit signal. Comparing means is provided for comparing the code registered in the register means with the preselected code an for generating an inhibit signal when the codes are different. Inhibit means is responsive to the inhibit signal for inhibiting transmission of the contents of the register means thereby preventing transmission of the preselected code to consequently produce an alarm condition at the receiving station or central office.

DESCRIPTION OF THE DRAWINGS

Other features and advantages of the present invention will become more apparent from a consideration of the following description, when taken in conjunction with the accompanying drawings, in which:

FIG. 2A, are the schematic circuit wiring diagrams of the code verification system, portion of alarm device, constructed according to the present invention.

DESCRIPTION OF THE PREFERRED EMBODIMENT

Figure 1A:
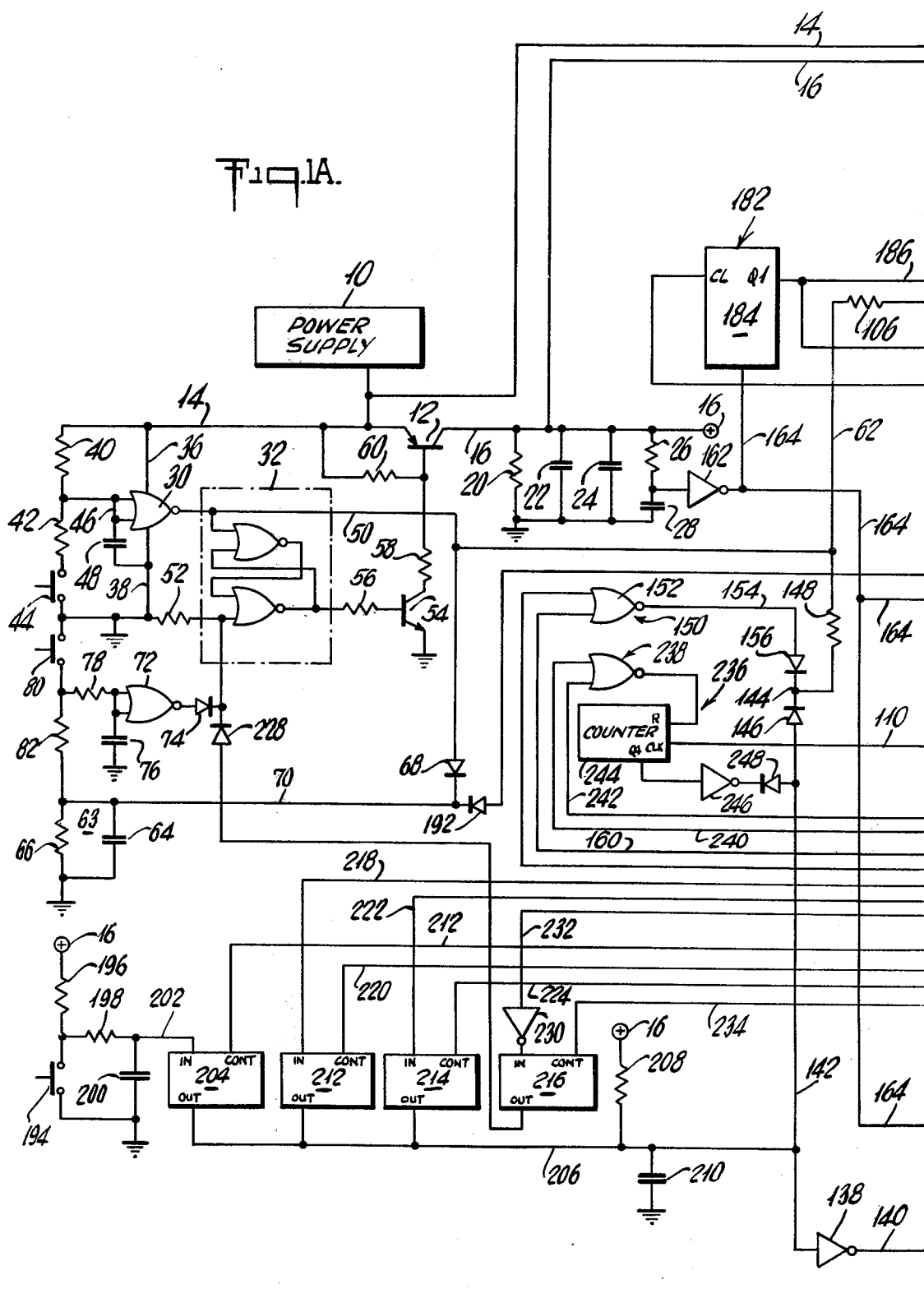
FIGS. 1A and 1B when placed side by side are a schematic circuit wiring diagram of the record and transmit portions of the alarm.

Basically, an alarm system incorporating the code verification system constructed according to the present invention essentially comprises a power section, a recording section, a transmitting section and the code verification system. The recording section and the transmitting section are controlled by a central control device. Each one of the sections and the code verification system is described in detail below.

POWER SECTION

The power section comprises a power supply 10 that is connected by a lead 14 to the emitter electrode of a transistor 12 and to the code verification system 300, as noted in detail below. The collector electrode of the transistor 12 is connected by a lead 16 to a filter network designated generally by the reference numeral 18 and to the code verification system 300. More specifically, the filter network comprises the parallel connection, between lead 16 and ground, of a resistor 20, capacitors 22 and 24, and a series circuit of a resistor 26 and a capacitor 28. The lead 16 is connected to the remainder of the elements in the circuit of FIGS. 1A and 1B and to a portion of the code verification system 300 to provide power thereto. In the interests of clarity, the connections of the circuit elements to the lead 16 have been eliminated since these connections are conventional. Accordingly, when the transistor 12 is driven into conduction, the lead 16 will be connected to the power supply 10 to apply power to the circuit elements.

Conduction of the transistor 12 is controlled by a NOR gate 30 and a set/reset flip-flop 32. (As is conventional, a NOR gate will produce a high output only when all input signals thereto are low). More specifically, the power terminals of the NOR gate are connected to the lead 14 and ground by respective leads 36 and 38. The lead 14 is connected to one input terminal of the gate 30 through a resistor 40. Similarly, the same input terminal of the gate 30 is connected to ground through the series circuit of a resistor 42 and a normally open pushbutton switch 44. The other input terminal of the gate 30 is connected to the first input terminal by a lead 46 and to the lead 38 through a capacitor 48. The output terminal of the gate 30 is connected by a lead 50 to one input terminal of the flip-flop 32. The other input terminal of flip-flop 32 is connected to ground through a resistor 52. The output terminal of the flip-flop 32 is connected to the base electrode of a transistor 54 through a resistor 56.

The emitter electrode of the transistor 54 is connected to ground and the collector electrode thereof is connected to the base electrode of the transistor 12 through a resistor 58. A resistor 60 also connects the base electrode of the transistor 12 to the lead 14.

In operation, when the button 44 is depressed, the input terminals of the gate 30 will be connected to ground through the resistor 42 and the closed contacts of the switch 44. Accordingly, the input signal to the gate 30 will be low thereby causing a high output signal to appear at the output terminals. Thus, a high signal will appear on the lead 50 and the flip-flop 32 will toggle, thereby driving the transistor 54 into conduction. When the transistor 54 conducts, a conducting path will be provided for the base electrode of the transistor 12 thereby driving the transistor 12 into conduction and applying power to the lead 16, thereby to energize the circuit elements.

A time delay network 63 comprising the parallel circuit of a capacitor 64 and a resistor 66 is connected between the lead 50 and ground through a diode 68 and lead 70. The diode is polarized so that the anode electrode thereof is connected to the lead 50 and the cathode electrode thereof is connected to the network 63 via the lead 70. The time delay network 63 is provided as a safety precaution to reset the flip-flop 32 and thereby deenergize the circuit elements if the switch 44 remains in the open state for a predetermined interval of time. That is, if the subscriber releases the pushbutton 44 for a period of time sufficient to permit the capacitor 64 to discharge, the flip-flop 32 will be reset, thereby causing transistor 54 to become non-conducting.

Additionally, if the subscriber makes an error in entering a code into the system of the present invention, means are provided to permit the subscriber to cancel the entry and begin a new entry. More specifically, a NOR gate 72 is provided, the output terminals of which are connected to that input terminal of the flip-flop 32 connected to the resistor 52, through a diode 74. The diode 74 is polarized so that the anode electrode thereof is connected to the output terminals of the gate 72 and the cathode electrode is connected to the input terminal of the flip-flop 32. The input terminals of the gate 72 are connected together and to ground through a capacitor 76. Additionally, the input terminals are connected to ground through a series circuit comprising a resistor 78 and a normally open pushbutton 80. The junction of the resistor 78 and the switch 80 is connected to the lead 70 through a resistor 82.

When the pushbutton switch 80 is depressed, the signals at the input terminals of gate 72 will go low thereby producing a high output signal. This high output signal will be applied to the reset terminal of flip-flop 32, thereby resetting the flip-flop and causing power to be removed from the circuit elements.

RECORDING SECTION

The recording station comprises counters 84A, 84B and 84C. The counters 84A–84C function to count the particular digit in the units, tens and hundreds columns of the code. However, it is to be noted that this is for illustrative purposes only and is not to be interpreted as being a limitation on the present invention. That is, the code may be more or less than three digits. The counters 84A–84C are conventional up/down counters which count the number of pulses applied to the clock terminal thereof and produce an output signal representative of the number of pulses counted in binary coded decimal code. That is, as is conventional, when a high signal is applied to the up/down terminal of the counters, the counters will count in the up direction. However, when a low signal is applied to the up/down terminal of the counters, the counters will count in the reverse or down direction. Additionally, when the count in the counters reaches zero, a low signal will be applied to the "CARRY" terminal of the counters. In this respect, the counters may be thought of as comprising a signal generator which generates a signal at the carry terminal when the count is zero. Alternatively, the counters may be through of as registers that register the code therein.

Leads 86A–86C connect the respective counters 84A–84C to binary coded decimal to seven-segment decimal display converters or drivers 88A–88C. Although single leads are shown, it is to be understood that a lead such as the lead or cable 86A may comprise a number of wires such that the appropriate number of output terminals of the counter 84A are connected to the corresponding input terminals of the converter 88A. The leads or cables 86A–86C also connect the output terminals of the respective counters or registers 84A–84C to the code verification system portion noted in greater detail below. The converters or drivers are conventional in construction and convert the binary coded decimal signals applied to the input terminals into appropriate signals for reproducing the decimal digit by a seven-segment display. That is, if the signals at the output of the counter 84A, for example, represent the decimal digit 3 in binary form, the output terminals of the converter 88A necessary for illuminating the segments which comprise the digit "3" will be energized. Connected to the converters 88A–88C by respective leads 90A–90C are the respective illuminated seven-segment displays 100A–100C. Again, it is to be understood that the leads or cables 90A–90C represent a plurality of wires which connect the respective terminals of a converter to the corresponding input terminals of the display. The displays are operable to produce a visual indication of the digit stored in the respective counter.

The pulses which clock the respective counters are produced by an oscillator 102. More specifically, the lead 62 is connected from the lead 50 to an input terminal of a NOR gate 104 through a resistor 106. The output terminals of the gate 104 are connected to the input terminal of oscillator 102 through a diode 107 which is polarized so that the anode electrode thereof is connected to the output terminals of the gate 104. A capacitor 108 is connected between the cathode electrode of the diode and ground. When the system is energized so that a high signal appears on the lead 62, the output signal of the gate 104 will go low, thereby energizing the oscillator 102. The oscillator 102 produces approximately two pulses per second.

The output terminals of the oscillator 102 are connected by a clock line 110 to the clock input terminals "CL" of the respective counters 84A-84C. Accordingly, each time a clock pulse is received by the counter, the counter will be incremented by one digit.

Each one of the units, tens and hundreds counters 84A-84C, respectively, is gated in sequence by a central control comprising a digital counter 112. In other words, the counter 112 may be thought of as a control device that controls the operations of the present system. As is conventional, the counter 112 is provided with ten output terminals. In response to a clock pulse, a high signal will appear at each output terminal in sequence. That is, upon receiving the reset signal, a high output will appear at the "0" output terminal of counter 112. When the clock signal is received, a high signal will appear at the "1" output terminal of the counter and the "0" output terminal will go low. This will continue in sequence at the remainder of the output terminals of the counter.

The "0" output terminal of the counter is connected by a lead 114 to one input terminal of a NOR gate 116. The other input terminal of the NOR gate 116 is connected to output terminal "3" of the counter 112 by a lead 118. The output terminals of the NOR gate 116 are connected to the clock enable input terminal "CE" of the counter 84A by a lead 120. When the signal at the "CE" terminal of the counter 84A goes low, the counter will be enabled to count clock pulses. This will occur whenever a high signal is applied to the lead 114 or the lead 118.

In a similar manner, the counter 112 and a NOR gate 122 control the operation of the counter 84B. More specifically, the two input terminals of the NOR gate 122 are connected to the "1" output terminal and the "5" output terminal of the counter 112 by respective leads 124 and 126. If a high signal is present at either the "1" or "5" output terminal of the counter 112, a low signal will appear at the output terminals of the gate 122 (which terminals are connected to the clock enable "CE" terminal of the counter 84B by a lead 128) thereby enabling the counter 84B to count clock pulses.

Additionally, the output terminals of a NOR gate 130 are connected by a lead 132 to the clock enable "CE" terminals of the counter 84C. The two input terminals of the gate 130 are connected to the "2" and "7" output terminals of the counter 112 by respective leads 134 and 136. Thus, if a high signal appears on either lead 134 or 136, the counter 84C will be enabled to count clock pulses.

The clock terminal "CL" of the counter 112 is connected to the output terminal of an inverter 138 by a lead 140. The input terminals of the inverter 138 are connected by a lead 142 to a junction 144. Serially connected in the lead 142 between the input terminals of the inverter 138 and the junction 144 is a diode 146 which is polarized so that the anode electrode thereof is connected to the input terminals of the inverter 138. Also connected to the junction 144, through a resistor 148 is the lead 62. A steering circuit, designated generally by the reference character 150, is also connected to the junction 144. More specifically, the steering circuit 150 comprises a NOR gate 152, the output terminals of which are connected by a lead 154 to the junction 144 through a diode 156. The diode 156 is polarized so that the anode electrode thereof is connected to the output terminals of the gate 152. One input terminal of the two-terminal gate 152 is connected by a lead 158 to the lead 114. The other input terminal to the gate 152 is connected by a lead 160 to the lead 124. Accordingly, if a high signal is present on either the lead 114 or the lead 124, a low signal will appear at the output terminals of the gate 152.

Connected between the resistor 26 and the capacitor 28 of the filter 18 in the power section are the input terminals of an inverter 162. The output terminals of the inverter 162 are connected by a reset line 164 to the reset terminals of the logic elements. That is, the lead 164 is connected to the "reset" terminal of the counter 112 and to the reset terminals "RE" of the counters 84A-84C.

In operation, it will be assumed that the subscriber utilizing the system of the present invention wishes to record and transmit the code "312". Accordingly, upon depressing the pushbutton 44, the flip-flop 32 will toggle thereby placing an energizing signal on the lead 16 and a high signal on the lead 62, as noted hereinabove. As the capacitor 28 begins to initially charge, a high signal will appear on the lead 164 thereby resetting the counters 84A-84C and the counter 112. Thus, a high signal will appear on the lead 114 which is connected to the "0" output terminal of the counter 112, thereby causing a low signal to appear on the lead 120, connected to the output terminals of the NOR gate 116. Thus, the counter 84A will be enabled to count clock pulses. Since low signals will be present at the input terminals to the respective NOR gates 122 and 130, the counters 84B and 84C respectively associated therewith will be inhibited.

The high signal on the lead 62 will cause a low signal to appear at the output terminals of the NOR gate 104 thereby energizing the oscillator 102 to produce a pulse train. The pulses are applied via lead 110 to the clock input terminal of the counter 84A so that the counter begins counting in the up direction. The output signals at the counter 84A will be applied to the binary coded decimal to seven-segment converter 88A which, in turn, produces a visual indication of the decimal digit stored in the counter 84A via the display 100A. The subscriber maintains the pushbutton 44 depressed until he observes the digit "2" on the display 100A, thereby indicating that the correct units digit has been stored or registered in the counter 84A. The subscriber then releases the pushbutton which causes the signal at the output of the NOR gate 30 in the power section to go low. Hence, the signal on the lead 62 will now go low. However, the elements will remain energized since the flip-flop 32 is still in the "set" state. If, however, the subscriber made an error and entered a digit other than "2" into the counter 84A, the subscriber would depress the cancel button 80 and thereby de-energize the entire unit by resetting the flip-flop 32. Moreover, the subscriber can depress the button 80 at any time to cancel recording of the code or transmitting of the code.

The high signal on the lead 114 is applied to the input terminal of the NOR gate 152 via the lead 158. Accordingly, a low signal will appear at the output terminals of the NOR gate 152. However, when the pushbutton 44 is depressed, the junction 144 will remain high since the signal on the lead 62 is high. However, when the pushbutton 44 is released, the signal at the junction 144 goes low. The inverter 138 inverts this low signal and produces a high signal on the lead 140 which clocks the counter 112, thereby causing a high signal to appear at the "1" output terminal of the counter and a low signal to appear at all the remaining output terminals of the counter. As a result, low signals will be applied to both input terminals of the NOR gate 116 to cause a high signal to appear at the "CE" terminal of the counter 84A to inhibit the counter. On the other hand, a high signal will appear on the lead 124 thereby causing a low signal to appear on the lead 128 and enabling the counter 84B.

When the subscriber again depresses the count pushbutton 44, a high signal will appear on the lead 62 thereby energizing the oscillator 102 and clock pulses or a pulse train will now appear on the lead 110. The counter 84B will now count these pulses and cause the digit stored therein to be displayed on the display 100B. When the subscriber observes that the "1" tens digit has been stored in the display 100B, he then releases the pushbutton 44. This action again deenergizes the oscillator 102 to eliminate further counting. Additionally, since a high signal is applied to the other input terminal of the steering circuit NOR gate 152 via the leads 124 and 160, the junction 144 will again go low when the signal on the lead 62 goes low in response to the release of the pushbutton switch. Therefore, the counter 112 will again be clocked to cause a high signal to appear on the "2" terminal of the counter and a low signal to appear at the remaining output terminals.

Since a high signal appears on the lead 134, the counter 84C will now be enabled whereas the counters 84A and 84B will be inhibited. Upon depression of the pushbutton 44, the oscillator 102 will be energized to operate the counter 84C. When the subscriber observes (via the display 100C) that the hundreds digit "3" has been stored in the counter 84C, he releases the pushbutton 44. A low signal now appears on the lead 62 thereby denergizing the oscillator 102. However, since the signals on the leads 158 and 160 are both low, a high signal will appear at the output terminals of the NOR gate 152 thereby maintaining a high signal at the junction 144 regardless of the signal appearing on the lead 62. Thus, no clock signal will be applied to the counter 112 due to the release of the pushbutton 44.

Assuming that the subscriber does not immediately place the system in the transmit mode in the manner indicated below, after a preselected time interval determined by the time delay network 63, the flip-flop 32 will be reset. This arrangement provides an added safety feature in that it does not permit unauthorized personnel to view the code on the displays 100A–100C. That is, if the system is not placed in the transmit mode within a preselected interval of time, the system will be deenergized and the displays 100A–100C will become blank.

TRANSMIT SECTION

A number of elements are common to both the recording and transmitting sections. For example, the counter 112 and the associated control NOR gates are common to both sections and provide a central control for both the recording and transmitting sections.

In addition to the common elements, the transmitting section includes a NOR gate 166, one input terminal of which is connected to the output terminals of the oscillator 102 via the clock line 110. The other input terminal of the NOR gate 166 is connected to the collector electrode of a transistor 168, the emitter electrode of which is connected to ground. The transistor bias is obtained by connecting the collector electrode to the power lead 16 through a resistor 170. The base electrode of the transistor 168 is connected by a lead 172 to the leads 118, 126 and 136 through respective resistors 174, 176 and 178. The output terminals of the gate 166 are connected by a lead 167 to the base electrode of a transistor 169. The lead 167 is also connected to the code verification system 300. Additionally, a current limiting resistor 180 is serially connected in the lead 167 between the gate 166 and the transistor 169. The collector electrode of the transistor 169 is connected to the power source 16 through the winding of a relay 171. The collector electrode is also connected by a lead 173 to the code verification system 300. A zener diode 175 is connected in parallel with the collector-emitter path of the transistor 169 (with the anode electrode thereof connected to the emitter electrode of the transistor).

The relay winding 171 controls the operation of normally open contacts 171A which are connected to the receiver via an appropriate transmission line. Thus, when the winding 171 is energized, the contacts 171A close. As the winding is pulsed, the contacts 171A close and open to transmit a series of pulses to the receiver. More specifically, when transistor 168 is driven into conduction by a high signal appearing on either of the leads 118, 126 or 136, the pulses appearing on the lead 110 from the oscillator 102 will be transmitted via the NOR gate 166 to the base electrode of the transistor 169. This will drive the transistor alternately between conducting and non-conducting states thereby pulsing the relay in synchronism with the pulses from oscillator 102. As a result, the contacts 171A will alternately close and open to produce corresponding pulses at the central office or receiver.

When the system is placed in the transmit mode, it remains in the transmit mode by a latch designated generally by the reference character 182. More specifically, the latch 182 comprises a "JK" flip-flop 184, the clock terminal "CL" of which is connected to the lead 118 by a lead 185. The "Q1" output terminal of the flip-flop 184 is connected by a lead 186 to one input terminal of the NOR gate 104 and to the code verification system 300. The lead 186 is also connected to the input terminals of an inverter 188, the output terminals of which are connected by a lead 190 to the "up/down" terminal of the counters 84A–84C. Additionally, the lead 190 is connected to the bit inhibit terminal "BI" of the converters 88A–88C.

The lead 186 is also connected to the lead 70 through a diode 192, the cathode electrode of which is connected to the lead 70. The reset line 164 is connected to the "reset" terminal of the flip-flop 182. Accordingly, the flip-flop 182 will be reset along with the remainder of the other logic elements when the system is initially energized.

The transmit mode of the system is initiated by depressing a normally open pushbutton switch 194. That is, one terminal of the switch 194 is connected to ground and the other terminal is connected to the power lead 16 through a resistor 196. The junction of the resistor 196 and the switch 194 is connected through a resistor 198 to one end of a capacitor 200, the other end of which is connected to ground. The junction of the resistor 198 and the capacitor 200 is connected to the "IN" terminal by a lead 202 of a so-called solid state or analog switch 204. The switch 204 is conventional in construction and operates in the following manner. When a high signal is applied to a control terminal "CONT.", whatever signal appears at the input terminal "IN" of the switch will also appear at the output terminal "OUT" of the switch. Thus, if the input terminal "IN" of the switch is grounded, then a ground signal will appear at the output terminal "OUT" when a high signal is applied to the control terminal "CONT.". The output terminal "OUT" of the switch 204 is connected by a lead 206 to the lead 142. The lead 206 is connected to the power lead 16 through a resistor 208. Additionally, the lead 206 is connected to ground through a capacitor 210. The control terminal "CONT." of the switch 204 is connected by a lead 212 to the lead 134.

The lead 206 is also connected to the output terminals "OUT" of solid-state switches 212 and 214. The input terminal "IN" of the switch 212 is connected by a lead 218 to the "CARRY" terminal of the counter 84A. The control terminal "CONT." of the switch 212 is connected by a lead 220 to the lead 118. In a similar manner, the input terminal "IN" of the switch 214 is connected by a lead 222 to the "CARRY" terminal of the counter 84B. The control terminal "CONT." of the switch 214 is connected by a lead 224 to the lead 126.

Additionally, a solid-state switch 216 is provided having an output terminal "OUT" which is connected by a lead 226 to the reset terminal of the flip-flop 32 through a diode 228. That is, the anode electrode of the diode 228 is connected to the output terminal of the switch 216 and the cathode electrode of the diode is connected to that terminal of the flip-flop 32 which is connected to the resistor 52. The input terminal "IN" of the switch 216 is connected to the output terminals of an inverter 230, the input terminals of which are connected by a lead 232 to the "CARRY" terminal of the counter 84C. The control terminal "CONT." of the switch 216 is connected by a lead 234 to the lead 136.

To insure that there is a uniform spacing between the digits when the same are transmitted, a spacing circuit designated generally by the reference number 236 is provided. The circuit 236 comprises a NOR gate 238, one input terminal of which is connected by a lead 240 to the "4" output terminal of the counter 112. The other input terminal of the gate 238 is connected by a lead 242 to the "6" output terminal of the counter 112. The output terminals of the NOR gate 238 are connected to the "reset" terminal of a counter 244. The "4" output terminal of the counter 244 is connected to the input terminals of an inverter 246, the output terminals of which are connected to the lead 142 through a diode 248. The diode is polarized so that the anode electrode thereof is connected to the lead 142. Additionally, the clock line 110 is connected to the clock input terminal "CLK" of the counter 244. When a high signal appears on either one of the leads 240 or 242, the low signal appearing at the output terminals of the gate 238 will release the counter 244 from being held in reset. After four pulses have been received by the counter on the clock line 110, a high output signal will appear at the "4" output terminal of the counter, thereby causing a low signal to appear at the output terminals of the inverter 246, which low signal is applied to the lead 142.

When it is desired to place the system in the transmit mode, after the correct code has been loaded into the recording section, the pushbutton 194 is depressed. At this point, it will be noted that the signal on the lead 134 is high. That is, as previously stated, upon release of the pushbutton 44 after the hundreds digit has been loaded into the recording section, the junction 144 will remain high since both signals to the input terminals of the NOR gate 152 are low. This arrangement permits both two and three digit codes to be used since the hundreds counter does not necessarily have to be loaded with a number. Accordingly, no further clock signals will be applied to the counter 112 until the transmit pushbutton 194 is depressed. When the pushbutton is depressed, ground will be applied to the lead 202 which will be transmitted, through the switch 204 to the lead 206. This ground signal will therefore appear at the input terminals of the inverter 138 and produce a high signal at the output thereof which will clock the counter 112. A high signal will therefore appear at the "3" output terminal of the counter 112. This high signal will be applied via the leads 118 and 185 to the flip-flop 184 thereby setting the flip-flop. Accordingly, a high signal will now appear on the lead 186 which produces three results. In the first place, the high signal on the lead 186 causes a low signal to appear at the output terminals of the gate 104 thereby energizing the oscillator 102 to produce a continuing pulse train on the clock line 110. Additionally, this high signal is applied to the input terminals of the inverter 188 thereby causing a low signal to appear on the lead 190. This low signal is applied to the "up/down" terminals of the counters 84A-84C, thereby causing the counters to count in the down direction. Additionally, this low signal is applied to the bit inhibit terminals "BI" of the converters 88A-88C. This action removes the digits from the displays 100A-100C. Thus, all the operator need do is depress the transmit button 194 and the code will immediately disappear from the displays thereby preventing unauthorized personnel from viewing the code once the system has been placed in the transmit mode.

Additionally, the high signal on the lead 186 is applied to the lead 70 through the diode 192. This prevents operation of the time delay network 63 which, in turn, prevents resetting of the flip-flop 32 by the time delay network during a transmission cycle.

The high signal on the lead 118 will also be applied to the base electrode of the transistor 168 through the lead 172, thereby applying a low signal to one input terminal of the NOR gate 166. Hence, the output signal at the NOR gate 166 will now follow the pulses on the lead 110, so that effectively, the pulses on the clock line will be applied to the receiver via the transmission line in the manner noted above.

Moreover, the high signal on the lead 118 will be applied to the NOR gate 116 thereby causing a low signal to appear at the clock enabel terminal "CE" of the counter 84A to enable the counter. The pulses appearing on the clock line 110 will now be counted by the counter 84A in the down direction. Since the oscillator pulses are simultaneously applied to the counter 84A and the NOR gate 166, it will be obvious that each pulse transmitted to the transmit line will be counted by the counter 84A.

The counter 84A will continue to count in the down direction until zero count is reached at which time the signal at the "CARRY" terminal of the counter will go low. This low signal is applied to the input terminal "IN" of the solid-state switch 212. Since the lead 220 is connected to the lead 118, a high signal will appear at the control terminal "CONT." of the switch 212. Therefore, the low signal on the lead 218 will be connected through to the lead 206 thereby clocking the counter 112. At this point, the signal at the "4" output terminal of the counter will go high and the signals at all the remaining terminals will go low. Thus, a high signal will appear on the lead 240. Since a low signal now appears on the lead 118, the counter 84A will be inhibited. Moreover, the transistor 168 will be rendered non-conducting whereby a high signal will continuously be applied to one input terminal of the gate 166, thereby preventing transmission of the pulses on the lead 110.

The high signal on the lead 240 will cause a low signal to appear at the output terminals of the gate 238, thereby releasing from reset the counter 244. Since the oscillator 102 continues to produce a pulse train due to the latching effect of the flip-flop 184, the counter 244 will now begin to count pulses. After four pulses have been received, a high signal will appear at the "4" output terminal of the counter 244 thereby causing a low signal to appear at the output terminals of the inverter 246. When the signal on the lead 142 goes low, the counter 112 will again be clocked in the manner noted above. Thus, a high signal will now appear at the "5" output terminal of the counter 112 and the signals at the remaining terminals will go low.

A high signal will now appear on the lead 126 which will be applied to the base electrode of the transistor 168 via the lead 172, thereby enabling the NOR gate 166 to again transmit the pulses on the lead 110. Additionally, the high signal on the lead 126 will enable the NOR gate 122 and thereby enable the counter 84B to begin counting in the down direction. This count will continue until the counter 84B reaches a zero count at which time a low signal will appear on the lead 222 which is connected to the "CARRY" terminal of the counter 84B. This signal will again be transmitted to the lead 206 through the switch 214 in view of the fact that the control terminal thereof is connected to the lead 126 via the lead 224. The counter 112 will again be clocked whereby a high signal will appear at the "6" output terminal of the counter and the signal at the remaining terminals will go low.

Thus, a high signal will appear on the lead 242 which will cause the signal at the output terminals of the NOR gate 238 to go low and release from reset the counter 244. After the four pulses have been received from the clock line 110, the counter 112 again will be clocked in the manner indicated above. Hence, a high signal will appear at the "7" output terminal of the counter and the signals at the remaining terminals will go low. This will cause a high signal to appear on the lead 136 and thereby drive the transistor 168 into conduction to permit transmission of pulses. Additionally, the high signal on the lead 136 will cause a low signal to appear at the output terminals of the NOR gate 130, thereby enabling the counter 84C to begin counting pulses in the down direction. This action will continue until a zero count is reached at which time the signal at the "CARRY" terminal of the counter will go low, thereby applying a low signal to the input terminal of the inverter 230 via the lead 232. Assuming a two-digit was used, the hundreds counter would be at "0" and the low output signal on the "CARRY" terminal would reset immediately. Since a high signal is present at the control terminal of the switch 216 via the leads 136 and 234, the high signal appearing at the output terminals of the inverter 230 will pass through the switch and be applied to the reset terminal of the flip-flop 32 via the lead 226 and a series connected diode 228. This action will reset the flip-flop 32 thereby deenergizing the system.

From a consideration of the above, it will be noted that a uniform spacing is maintained between the digits comprising code. That is, in the illustrative example, the transmission of each successive digit comprising the code will be delayed by a time interval equal to four pulses since the counter 244 must receive four pulses before it operates to cause clocking of the counter 112.

CODE VERIFICATION SYSTEM

Figure 2A:
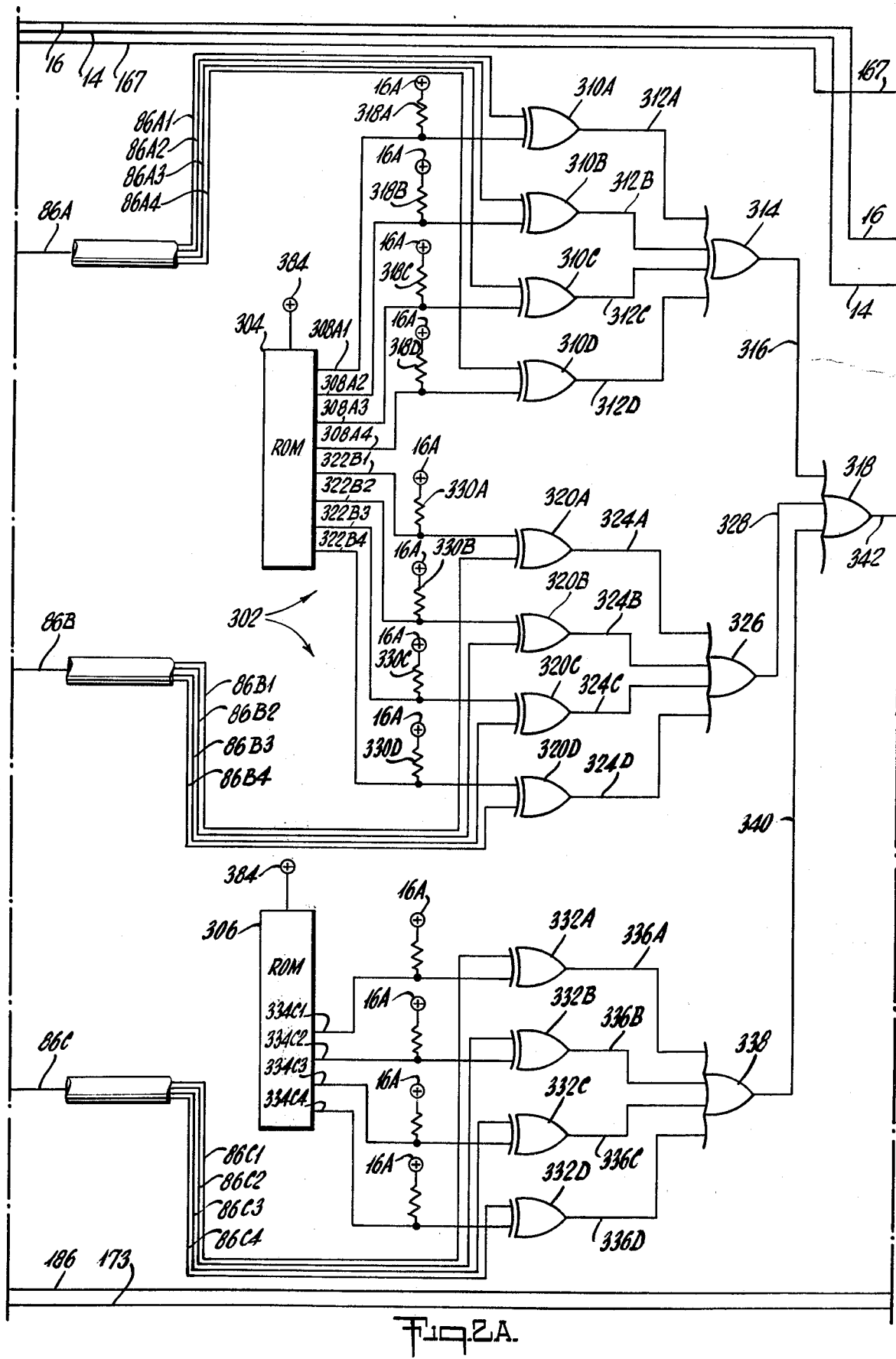
FIG. 2A, when placed adjacent FIG. 1B, and FIG. 2B, when placed adjacent
Figure 2B:
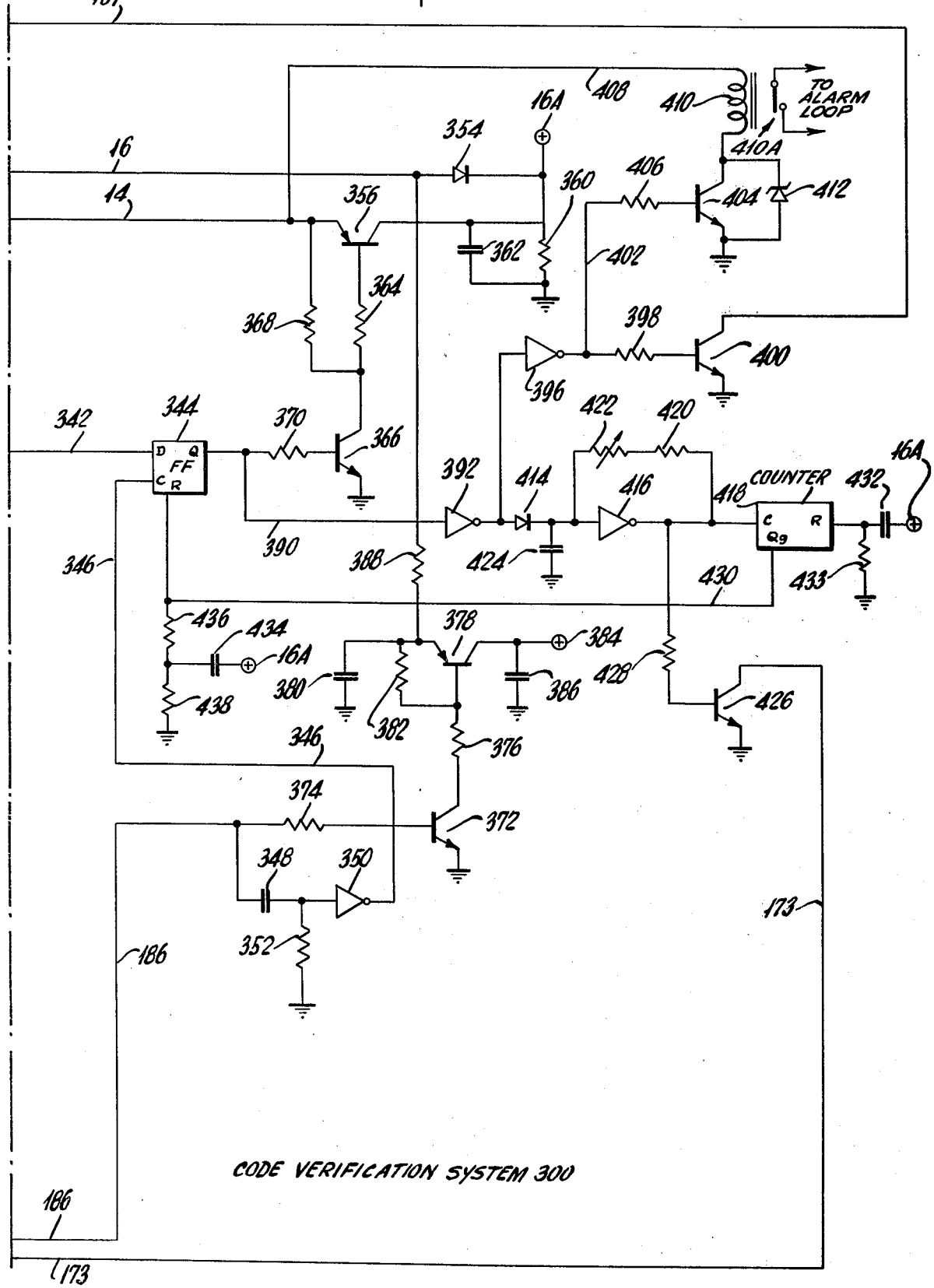

The code verification system 300 is shown in FIGS. 2A and 2B and is illustrated so that the complete system may be viewed by placing FIG. 2B to the right of FIG. 2A. The system 300 includes a comparing section designated generally by the reference numeral 302 which operates to compare the code stored in the counters or registers 84A–84C with the preselected code for which this particular station is designed. If the entered code is correct, it is then transmitted to the receiving station in the manner noted above. However, if the entered code is other than the proper or preselected code for which the station is designed, a signal is generated by the comparator 302 which, in turn, causes an alarm signal to be transmitted to the central office or receiving station.

More specifically, the comparator 302 comprises read only memories or ROM's 304 and 306. The ROM 304 is adapted to store the units and tens portion of the code in binary coded decimal form whereas the ROM 306 is adapted to store the hundreds portion of the code in binary coded decimal form. In practice, the ROM's may comprise 8-bit fuse link type integrated circuits such as Harris type 7602-1. Since only three decimal digits are going to be compared, 8-bits of the ROM 304 are used and only 4-bits of the ROM 306 are used.

The first four output terminals of the ROM 304 are connected by respective leads 308A1–308A4 to the input terminals of Exclusive Or or X'OR gates 310A–310D. The other input terminals of the gates 310A–310D are connected to the respective output terminals of the counter 84A by the lead or cable 86A. That is, as noted hereinabove, the output terminals of counters 84A–84C produce one of the respective decimal digits of the code in binary coded decimal form. In other words, the code representing the decimal digit is a 4-bit code. The respective bits are applied to the associated converter such as converter 88A by a cable 86A which may comprise four leads or wires that connect the respective terminals comprising the decimal digit in binary coded decimal form to the corresponding terminals of the converter. In a like manner, the individual bits comprising the units number registered by counter 84A are applied to the respective gates 310A–310D by leads 86A1–86A4, which comprise the cable 86A. The output terminals of the X'OR gates 310A–310D are connected by respective leads 312A–312D to the respective input terminals of an OR gate 314. The output terminals of the gate 314 are connected by a lead 316 to an input terminal of an OR gate 318. The leads 308A-1–308A4 are connected through respective resistors 318A–318D to a source 16A.

In a like manner, the last four terminals of the ROM 304 represent the bits of the tens portion of the code and are connected to the respective input terminals of X'OR gates 320A–320D by leads 322B1–322B4. Similarly, the output of the counter 84B is connected to the other input terminals of the respective gates 320A–320D by the leads 86B1–86B4 which comprises the cable 86B. The output terminals of the gates 320A–320D are connected by respective leads 324A–324D to the input terminals of an OR gate 326. The output terminals of the gate 326 are connected by a lead 328 to another input terminal of the gate 318. The leads 322B1–322B4 are connected through respective resistors 330A–330D to the source 16A.

In a like manner, the ROM 306 stores the 4-bits representing the hundreds decimal digit portion of the code and the appropriate output terminals of the ROM 306 are connected to an input terminal of the respective X'OR gates 332A–332D by leads 334C1–334C4. The other input terminals of the respective gates 332A–332D are connected to the respective output terminals of the counter 84C by the leads 86C1–86C4 which comprise the cable 86C. The output terminals of the gates 332A–332D are connected by respective leads 336A–336D to the respective input terminals of an OR gate 338. The output terminals of the OR gate 338 are connected to another input terminal of the gate 318 by a lead 340.

In operation, if there is a lack of coincidence between any bit comprising a portion of any one of the digits of the code and the stored bit in the appropriate ROM, a signal will be produced at the output terminals of that one of the X'OR gates 310A–310D, 320A–320D or 332A–332D associated with mismatched bits. This signal will then be applied to the appropriate one of the OR gates 314, 326 or 328 and, accordingly, to one of the input terminals of the gate 318. This signal, which may be thought of as an inhibit signal will then appear on the lead 342 which is connected to the output terminals of the OR gate 318.

The lead 342 is connected to the data terminal "D" of a D flip-flop 344. The clock terminal "C" of the flip-flop 344 is connected by a lead 346 through the series circuit comprising a capacitor 348 and a schmitt trigger inverter 350. A resistor 352 is connected between the capacitor and the inverter and ground. The signal on the lead 186 is normally low thereby producing a high signal at the terminal "C" of the flip-flop 344 through the inverter 350. However, when the signal on the lead 186 goes high, the signal on the lead 346 immediately goes low until the capacitor 348 charges up according to the time constant determined by the value of the capacitor 348 and 352. In practice, the signal on the lead on the 346 remains low for a delay of approximately five microseconds whereupon the schmitt trigger inverter snaps back to its other state to produce a high signal on the lead 346. The rising signal on the clock terminal "C" causes the data signal at the data terminal "D" to be transferred to the output terminal "Q" of the flip-flop 344.

If the signal at the output terminal "Q" of the flip-flop 344 goes high in response to the detection of an incorrect code being entered into the registers or counters 84A–84C, a number of different functions occur. Thus:

1. Power is maintained in the code verification system 300 even though the power to the recording and transmitting sections may be disconnected.

2. A short circuit is placed across the alarm loop thereby causing an increased current to flow in the receiving station circuitry.

3. An oscillator begins transmitting an alarm signal to the receiving station to alert the observer that a hold-up is in progress.

4. A counter is activated which, after a predetermined cycle of operation, deenergizes the code verification system of the alarm device.

Figure 1B:
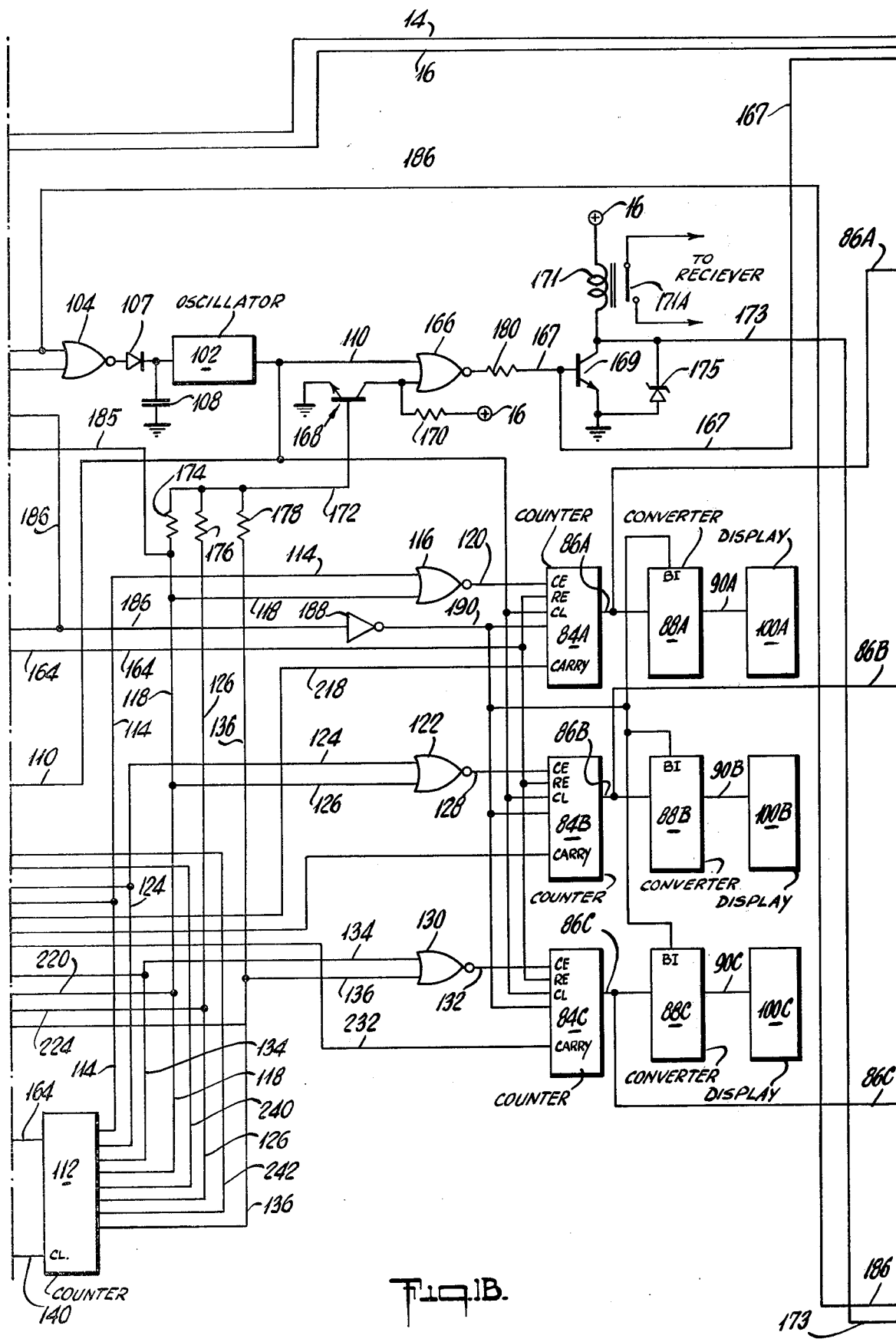

To be more specific, when the alarm device is actuated to introduce a code in the manner noted above, the power flip-flop 32 is toggled to produce an energizing signal on the lead 16 which, in effect, becomes the source of power for the circuit elements shown in FIGS. 1A and 1B. Additionally, the lead 16 is connected through a diode 354 to an energizing lead 16A. The lead 16A is connected to the various circuit elements comprising the code verification system 300 to power the same, with the exception of the ROM's which are powered separately as noted in greater detail below. Thus, in effect, the lead 16A may be thought of as being a source of power or energy 16A for the code verification system circuit elements.

Additionally, the lead 14 from the power supply 10 is connected to the emitter electrode of a transistor 356, the collector electrode of which is connected by a lead 358 to the lead 16A. The lead 16A is connected to ground through the parallel circuit of a resistor 360 and a capacitor 362. The base electrode of the transistor 356 is connected through a resistor 364 to the collector electrode of a transistor 366. The emitter electrode thereof is connected to ground. Connected between the emitter electrode of the transistor 356 and the collector electrode of the transistor 366 is a resistor 368. The base electrode of the transistor 366 is connected to the output terminal "Q" of the flip-flop 344 by a resistor 370. Accordingly, when the output terminal "Q" of the flip-flop 344 goes high, the transistor 366 begins conducting and drives the transistor 356 into conduction. This will cause a power signal to be applied to the lead 16A via the power supply 10, lead 14 and transistor 356. Thus, when an incorrect code is detected the circuit elements comprising the system 300 will remain energized even though the power signal may be removed from the lead 16.

Since the ROM's are usually not low power, a separate power source is utilized to supply power to the ROM's 304 and 306 upon initiation of a code comparison operation. In this manner, the ROM's draw practically zero average power.

Accordingly, a transistor 372 is provided, the base electrode of which is connected to the lead 186 through a resistor 374. The collector electrode of the transistor 372 is connected through a resistor 376 to the base electrode of a transistor 378. The emitter electrode of the transistor 378 is connected to ground through a capacitor 380. Additionally, a resistor 382 is connected in parallel with the base-emitter path of the transistor 378. The collector electrode of the transistor 378 is connected by a lead 384 to the power terminal of the ROM's 304 and 306. Accordingly, the lead 384 may be thought of as the power source for the ROM's. A capacitor 386 connects the collector electrode of the transistor 378 to ground. Additionally, the emitter electrode of the transistor 378 is connected through a resistor 388 to the lead 16.

When the signal on the lead 186 goes high the transistor 372 begins conducting. Accordingly, the transistor 378 will immediately be driven into conduction thereby permitting capacitor 380 to rapidly discharge. This rapid discharge of energy is applied to the ROM's through the lead 384. After the capacitor 380 has discharged, power will be supplied to the ROM's for the rest of the operation cycle from the lead 16 through the circuit elements including resistor 388, the emitter-collector path of the transistor 378, and the lead 384.

The output terminal "Q" of the flip-flop 344 is connected by a lead 390 to the input terminals of an inverting amplifier 392. The output terminals of the amplifier 392 are connected to two branch circuits. One branch circuit produces a high current in the alarm loop and also disables the output stage driving transistor 169. The other branch circuit energizes an oscillator that pulses the relay winding 171 at a rapid rate to produce an alarm signal in the central office.

The first branch circuit includes a lead 394 that connects the output terminals of the inverter 392 to the input terminals of another inverting amplifier 396, the output terminals of which are connected through a resistor 398 to the base electrode of a transistor 400. The emitter electrode of the transistor 400 is connected to ground and the collector electrode thereof is connected by the lead 167 to the base electrode of the transistor 169. Accordingly, when the transistor 400 is driven into conduction, the base electrode of the transistor 169 is essentially connected to ground thereby preventing operation of the relay winding 171 by the oscillator 102.

Additionally, the output terminals of the inverter 396 are connected by a lead 402 to the base electrode of a transistor 404. A resistor 406 is serially connected between the inverter 396 and the base electrode of the transistor 404. The emitter electrode of the transistor is connected to ground and the collector electrode thereof is connected to the lead 14 via a lead 408 and the winding of a relay 410. The relay winding 410 controls the operation of normally open relay contacts 410A which, in turn, are connected to the alarm loop. A zener diode 412 is connected in parallel with the emitter-collector path of the transistor 404. The anode electrode of the diode 412 is connected to the emitter electrode.

When the transistor 404 is driven into conduction, the relay winding 410 is energized to cause the contacts 410A to close thereby placing a short circuit in the alarm loop. As is conventional in alarm devices or systems of the type under consideration, different conditions exist in the transmission lines for day and night operation. For example, in a typical system, during the day the line to the receiver normally carries 20 milliamperes. However, at night, the line current is normally 12 milliamperes. Shorting of the alarm loop by the contacts 410A essentially removes resistance from the alarm loop and causes the current to rise to 26 milliamps. This increased current is easy to detect at a manually-operated central office since the needle jumps substantially and is also easy to detect at a computer-operated central office. Accordingly, the increased current normally indicates an alarm condition and energizes an alarm at the receiving station. However, this alarm condition can be attributed to a break-in, an accidently broken wire in the alarm system, etc. On the other hand, since the operator of the system can easily visually determine whether the entered code is correct, an incorrect code which is transmitted to the central office may be interpreted as indicating that a hold-up is in progress. Thus, in addition to simply placing a short circuit in the alarm loop, the present invention also transmits a low frequency signal to the receiver to indicate that such hold-up is in progress.

Accordingly, the output terminals of the inverter 392 are also connected through a diode 414 to the input terminals of a schmitt trigger inverter 416. The output terminals of the inverter 416 are connected to the clock terminal "C" of a counter 418. Connected in a feedback loop between the output and input terminals of the inverter 416 are serially connected resistors 420 and 422. Additionally, a capacitor 424 is connected between the input terminals of the inverter 416 and ground. As shown in FIG. 2B, the diode 414 is polarized so that the anode electrode thereof is connected to the output terminals of the inverter 392. The capacitor 424, the resistors 420 and 422 and the schmitt trigger inverter 416 form an astable low frequency oscillator. The signal from the oscillator is applied to the base electrode of a transistor 426 through a resistor 428. The emitter electrode of the transistor 426 is connected to ground and the collector-electrode thereof is connected by the lead 173 to the collector-electrode of the transistor 169. Accordingly, the output signal or pulses from the oscillator will drive the transistor 426 which, in turn, pulses the relay winding 171 on and off thereby producing a low frequency signal on the transmission line which is transmitted to the central office. Detection of this signal at the central office will trigger an alarm circuit to indicate an alarm condition.

Additionally, the signal from the oscillator (i.e., the output terminals of the inverter 416) are also applied to the clock terminal "C" of the counter 418. After a pre-selected number of cycles or pulses have been counted by the counter, a signal will appear at the output terminal "Q9" of the counter. The signal is applied via a lead 430 to the reset terminal "R" of the flip-flop 344 thereby resetting the same.

Additionally, the flip-flop 344 and the counter 418 are initially reset when power is applied to the circuit. Thus, the power source 16A is connected to the reset terminal "R" of the counter 418 through a capacitor 432 connected between the source 16A and the terminal "R" and a resistor 433 connected between the terminal "R" and ground. Additionally, the source 16A is connected to the reset terminal "R" of the flip-flop 344 through the circuit comprising a capacitor 434 and a resistor 436. The junction of the resistor and the capacitor is connected through a resistor 438 to ground.

In operation, when power is switched on, the lead 16 becomes energized thereby energizing the lead or power source 16A. Flip-flop 344 will be reset through capacitor 434 and resistor 436. Likewise, counter 418 will be reset through capacitor 432 and resistor 433. When flip-flop 344 has been reset, the signal at the output terminal "Q" will remain low.

The code verification system 300 will remain inoperative until the transmit pushbutton 194 is depressed to institute a transmission cycle of operation. At that point, the flip-flop 184 will change states, in the manner noted hereinabove, and a high signal will appear on the lead 186. At this point, a number of operations take place in the code verification system. To be more specific, the high signal on the lead 186 will drive the transistor 372 into conduction thereby causing the transistor 378 to conduct. As noted above, the capacitor 380 will quickly discharge through the emitter-collector path of the now conducting transistor 378 thereby momentarily applying power to the ROM's 304 and 306 via the lead 384. A comparison will then be made via the gates 310A–310D, 320A–320D and 332A–332D between the code stored in the counters or registers 84A–84C and the preselected or correct code stored in the ROM's 304 and 306. Assuming that the correct code has been entered by the operator, the signal on the lead 342 connected to the output OR gate 318 will remain low. Thus, when the flip-flop 344 is clocked, no change will occur at the output terminal thereof and the circuit elements other than transistors 372 and 378 will remain in the non-conducting state and the code will be transmitted to the central office in the manner noted above. However, if a mismatch is detected between any one of the digits entered in the registers and the preselected code, a high signal will appear on the lead 342.

At this point it should be noted that the operator of the system can visually determine whether the correct code or an incorrect code has been entered into the system prior to the initiation of a transmit cycle. Accordingly, the entry and transmission of an incorrect code can only mean that a hold-up is in progress. That is, either the code has been entered by unauthorized personnel who are not aware of the preselected code or the incorrect code may have been entered by an authorized operator who purposely entered the incorrect code to produce the alarm condition.

In any case, assuming that the signal on the lead 342 is high in response to the entry of an incorrect code, the clock terminal "C" of the flip-flop 344 will be energized approximately 5 microseconds after the signal has appeared on the lead 342 in the manner noted above. That is, when the signal on the lead 186 goes high power is applied to the ROM's immediately via the discharging capacitor 380 to effect the comparison and produce the signal, if necessary, on lead 342. However, this high signal is inverted by the schmitt trigger inverter 350 to produce a low signal on the lead 346. As the capacitor 348 begins to charge, the signal on the lead 346 becomes high again thereby clocking the signal on the lead 342 to the output terminal "Q" of the flip-flop 344.

The high signal at the output terminal of the flip-flop 344 drives the transistor 366 and, therefore, the transistor 356 into conduction. This assures that the power source 16A remains energized throughout the cycle of operation of the code verification system even though power may be removed from the lead 16 in response to resetting of the flip-flop 32.

Additionally, the high signal at the output terminal "Q" of the flip-flop 344 will be applied to the base electrode of the transistor 400 through the serially connected inverters 392 and 396 to connect the collector electrode of the transistor 400 to ground. Thus, since the base electrode of the relay driving transistor 169 is connected to the collector electrode of the transistor 400 through the lead 167, the drive to the relay driving transistor 169 will be shorted. This will prevent the stored code from being transmitted to the receiver. Additionally, transistor 404 will be driven into conduction thereby energizing relay winding 410 and placing a short circuit in the alarm loop to increase the current in the alarm loop.

Simultaneously therewith, the oscillator comprising inverter 416, resistors 420 and 422, and the capacitor 424 will be enabled to produce a low frequency signal which drives the transistor 426. As noted above, the transistor 426 is connected via the lead 173 in circuit with the relay winding 171 thereby to pulse the relay winding at the frequency determined by the oscillator. This will cause a low frequency signal to be transmitted to the receiver which, through appropriate circuitry (not shown), will produce an alarm signal at the receiving station.

Additionally, the output of the oscillator will be applied to the clock terminal "C" of the counter 418. The counter 418 will be incremented by each cycle of signal from the oscillator until it accumulates a predetermined count at which point the signal on the output terminal "Q9" will go high. This high signal will be applied to the reset terminal "R" of the flip-flop 344 by means of the lead 430 thereby resetting the flip-flop to deenergize the alarm producing portions of the code verification system 300. In other words, when the flip-flop 344 is reset, transistors 366 and 356 will be unlatched thereby removing power from this system. Additionally, the clamp on transistor 400 is removed to remove the short from the relay driving transistor. The short circuit condition in the alarm loop is also removed because the transistor 404 stops conducting. The oscillator portion of the code verification system stops oscillating and stops pulsing the relay 171. It should be noted that the oscillator portion of the code verification system 300 should be permitted to continue a sufficient time period so that the remainder of the alarm device described hereinabove has been deenergized prior to termination of the hold-up signal.

Accordingly, an alarm device having a code verification system has been described which eliminates any delay times or inaccuracies in determining whether an alarm condition exists at any one particular station.

While a preferred embodiment of the present invention has been shown and described herein it will become obvious that numerous omissions, changes and additions may be made in such embodiment without departing from the spirit and scope of the present invention.

What is claimed is:

1. An alarm device for registering and transmitting a preselected code to a receiving station comprising:
   (a) register means under control of an operator for registering a code entered therein;
   (b) transmitting means responsive to a transmit signal for transmitting the contents of said register means to the receiving station;
   (c) transmit signal generating means for generating said transmit signal;
   (d) a comparitor comprising storage means for storing said preselected code, and comparing means connected with said storage and register means for comparing the code registered in said register means with said stored preselected code and for generating an inhibit signal when said codes are different; and,
   (e) inhibit means responsive to said inhibit signal for inhibiting transmission of the contents of said register means.

2. An alarm device as in claim 1, and alarm means responsive to said inhibit signal for producing an alarm signal.

3. An alarm device as in claim 2, in which said alarm means comprises an oscillator energized by said inhibit signal to generate a signal having a predetermined frequency.

4. An alarm device as in claim 3, and counting means connected to said oscillator and responsive to a predetermined number of oscillator signals for deenergizing said system.

5. An alarm device as in claim 1, in which said transmitting means comprises a first relay, and a first relay driver stage connected thereto to selectively energize said relay to transmit said preselected code, and said inhibit means comprises deenergizing means for deenergizing said driver stage in response to said inhibit signal.

6. An alarm device as in claim 5, and a second relay operable in response to said inhibit signal for producing an alarm condition.

7. An alarm device as in claim 1, in which said register means comprises a plurality of counters, and a selectively operable oscillator for supplying pulses to said plurality of counters to increment said counters in response to each of said pulses.

8. An alarm device as in claim 7, in which said storage means comprises a plurality of ROM's in one-to-one correspondence with said plurality of counters, each of said plurality of ROM's being associated with a different one of said plurality of counters and storing the portion of said preselected code to be stored by said associated counter, and gating means for producing said inhibit signal when there is lack of coincidence between the code stored in one of said ROM's and the code registered in said associated counter.

9. An alarm device as in claim 1, in which said transmitting means comprises a first source of energy for energizing said system, and said comparitor further comprising a second source of energy for maintaining said inhibit means energized after said first source of energy has been removed.

* * * * *